(12) United States Patent
Barnes

(10) Patent No.: US 8,746,301 B2
(45) Date of Patent: Jun. 10, 2014

(54) PROTECTIVE COVER RETENTION ASSEMBLY

(75) Inventor: Kevin James Barnes, Westminster, MD (US)

(73) Assignee: Specialized Engineered Products LLC, Rochester, MI (US)

(*) Notice: Subject to any disclaimer, the term of this patent is extended or adjusted under 35 U.S.C. 154(b) by 469 days.

(21) Appl. No.: 13/022,719

(22) Filed: Feb. 8, 2011

(65) Prior Publication Data

US 2011/0192512 A1 Aug. 11, 2011

Related U.S. Application Data

(60) Provisional application No. 61/302,288, filed on Feb. 8, 2010.

(51) Int. Cl.
*B65D 65/02* (2006.01)

(52) U.S. Cl.
USPC .......... 150/166; 206/829; 296/136.1

(58) Field of Classification Search
USPC ........... 150/166, 168; 292/DIG. 28; 206/829; 248/205.5, 206.2, 362, 363; 296/95.1, 296/136.1, 136.11; 160/370.21
See application file for complete search history.

(56) References Cited

U.S. PATENT DOCUMENTS

| | | | | | |
|---|---|---|---|---|---|
| 735,415 | A | * | 8/1903 | Schrodel | 473/574 |
| 1,883,791 | A | * | 10/1932 | Jewell | 40/597 |
| 2,119,072 | A | * | 5/1938 | Cohen | 280/770 |
| 2,243,106 | A | * | 5/1941 | Limbert | 81/53.11 |
| 2,608,942 | A | * | 9/1952 | Smith | 52/3 |
| 2,815,919 | A | * | 12/1957 | Pribil | 248/363 |
| 3,140,115 | A | * | 7/1964 | Biiss | 150/168 |
| 4,181,350 | A | * | 1/1980 | Eichstaedt | 150/168 |
| 4,736,980 | A | * | 4/1988 | Eubanks | 160/370.22 |
| 5,176,357 | A | * | 1/1993 | Hobart, II | 248/683 |
| 5,356,191 | A | * | 10/1994 | Sheehan | 296/95.1 |
| 5,441,095 | A | * | 8/1995 | Trethewey | 160/370.21 |
| 6,143,391 | A | * | 11/2000 | Barnes et al. | 428/99 |

* cited by examiner

*Primary Examiner* — Sue A Weaver
(74) *Attorney, Agent, or Firm* — Carlson, Gaskey & Olds, P.C.

(57) ABSTRACT

A disclosed protective cover assembly includes features that maintain a suction cup in a desired orientation such that a release tab remains accessible and includes features that aid in positioning and that prevent errant premature release. The disclosed protective panel assembly includes an improved suction cup that provides for limited contact during positioning of the panel. Further, the assembly includes the clip that holds the suction cup in place while also protecting the release tab. The protective cover includes pad and cushion that pulls on the button of the suction cup to generate a vacuum within a desired range that does not affect the surface finish while generating a sufficient holding force.

19 Claims, 4 Drawing Sheets

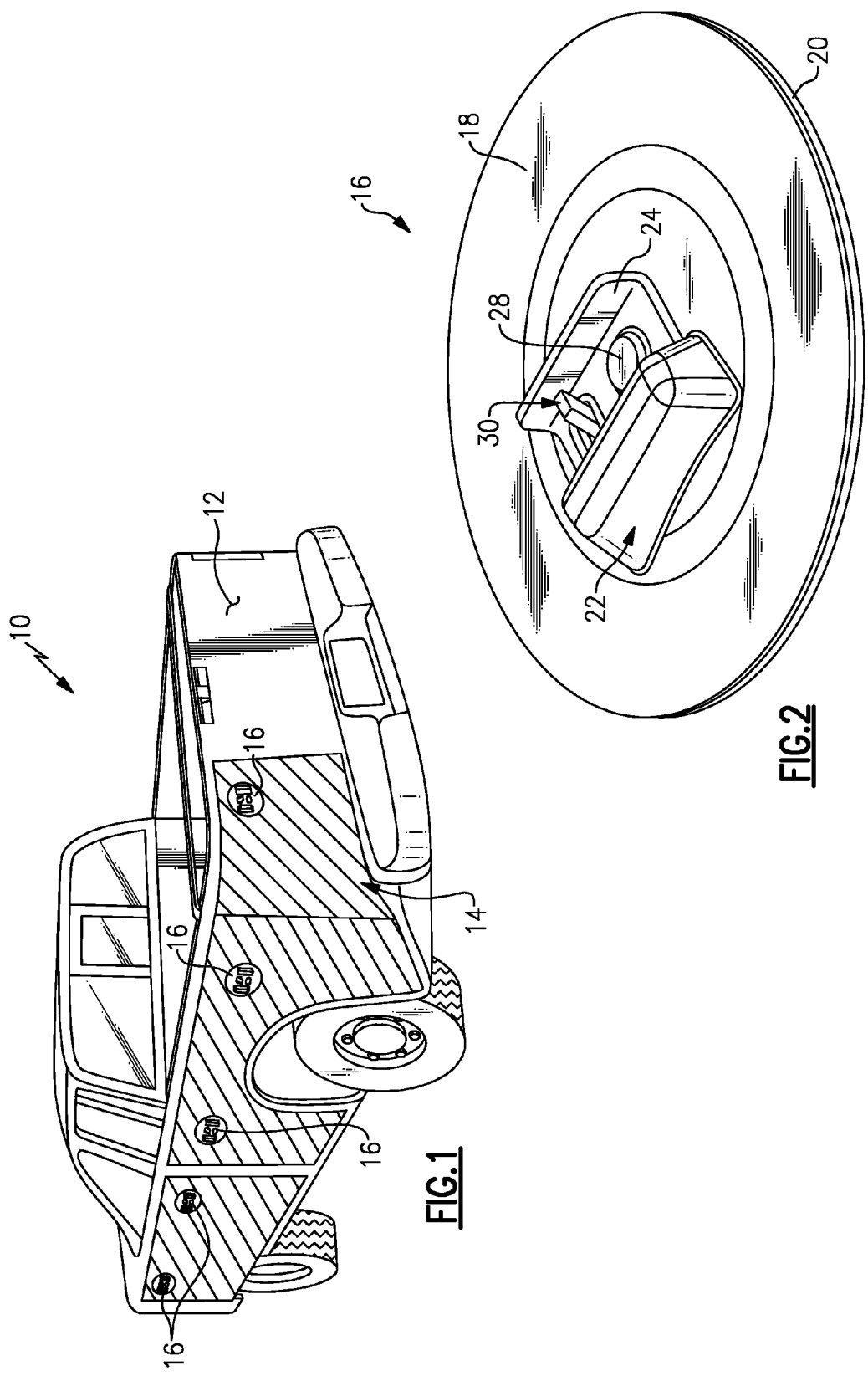

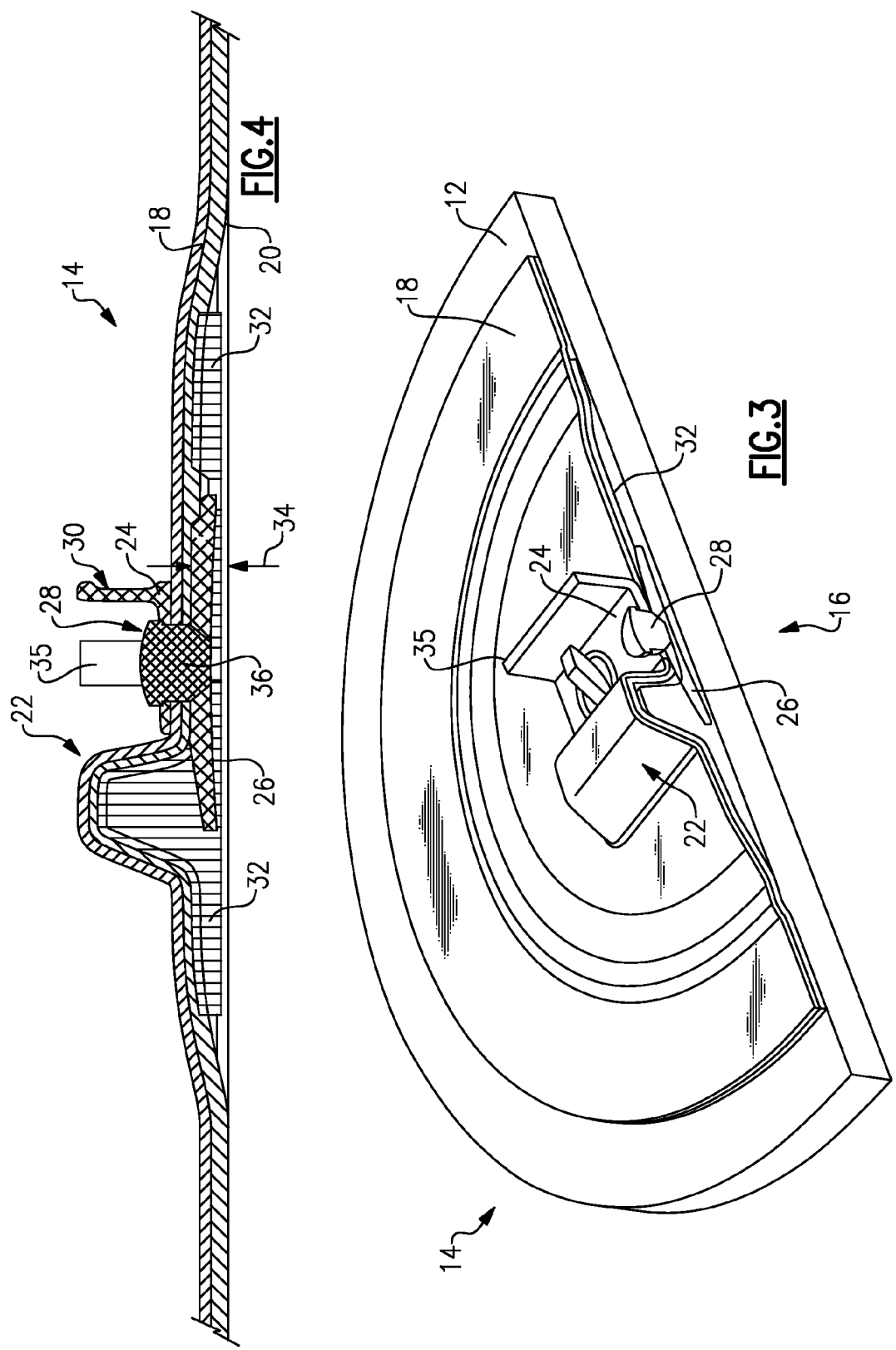

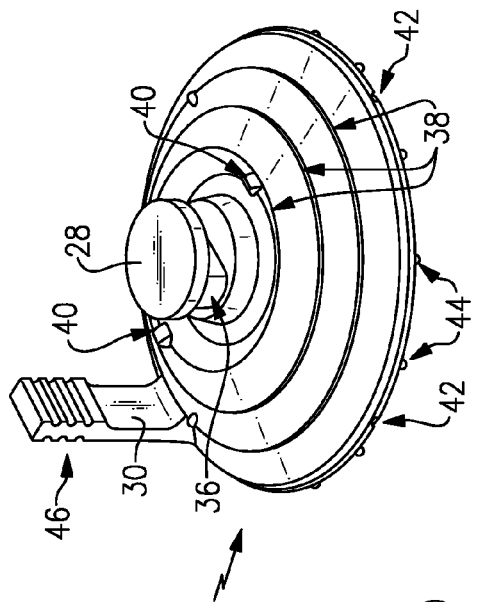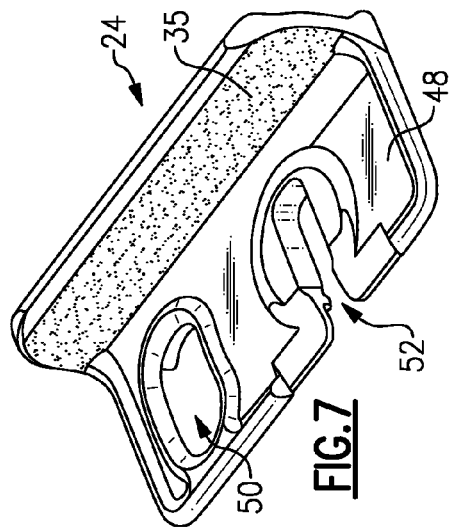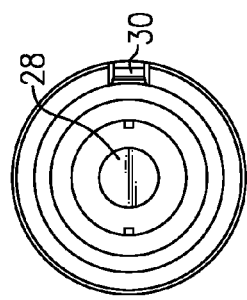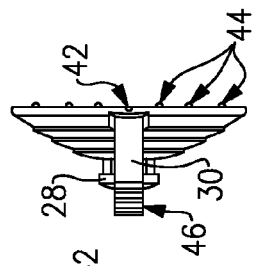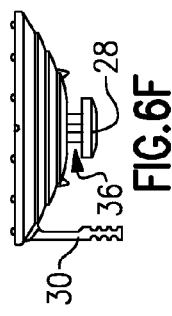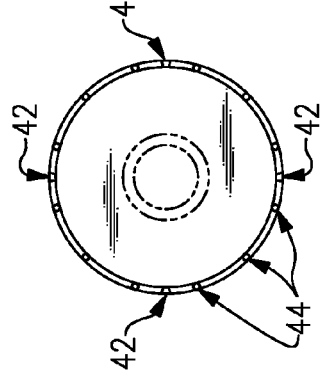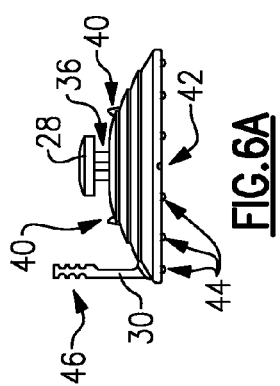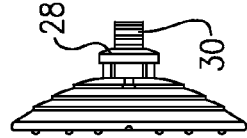

PROTECTIVE COVER RETENTION ASSEMBLY

CROSS REFERENCE TO RELATED APPLICATION

This application claims priority to U.S. Provisional Application No. 61/302,288 which was filed on Feb. 8, 2010.

BACKGROUND

This disclosure relates to a protective cover assembly for a painted or finished part. More particularly, this disclosure relates to a protective cover assembly including a suction cup for securing a cover to a painted surface of a vehicle.

During assembly of a vehicle, painted surfaces are protected by temporary covers. The covers are fit to match the features of the vehicle panel and are held in place by suction cups where other mechanical attachment methods and devices are not practical. The suction cup provides a secure and removable mounting location for the covers.

Disadvantageously, suction cups currently in use require special tools to install and can exert undesirably large amounts of force to remove. Accordingly, it is desirable to design and develop improved methods and devices for holding a protective cover in place.

SUMMARY

A disclosed protective cover assembly includes features that maintain a suction cup in a desired orientation such that a release tab remains accessible and includes features that aid in positioning and that prevent errant premature release.

The disclosed protective cover assembly includes an exterior cover that is backed by a pad that contacts a finished surface. The protective cover includes at least one mounting location with a clip that holds the suction cup in a desired orientation relative to the cover. The clip includes two openings, one for the button and one for the release tab of the suction cup. One of the openings in the clip is a slot for a stem of the suction cup that prevents rotation of the suction cup relative to the protective cover. The clip also includes a flange that extends outward from the protective cover assembly to shield the release tab from errant contact. A plurality of nubs prevents the formation of vacuum until the cover is in a desired location. The button is then pushed into disengage the nubs and form the desired vacuum holding force. The suction cup generates a holding force as it is pulled away from the finished surface by the exterior cover. Release of the suction cup and cover is provided by tugging the release tab.

Accordingly, the disclosed protective panel assembly includes an improved suction cup that provides for limited contact during positioning of the panel. Further, the assembly includes the clip that holds the suction cup in place while also protecting the release tab. The protective cover includes pad and cushion that pulls on the button of the suction cup to generate a vacuum within a desired range that does not affect the surface finish while generating a sufficient holding force.

These and other features disclosed herein can be best understood from the following specification and drawings, the following of which is a brief description.

BRIEF DESCRIPTION OF THE DRAWINGS

FIG. 1 is a vehicle with attached protective cover assemblies.

FIG. 2 is a schematic view of a mount assembly for the protective cover.

FIG. 3 is a sectional view of the mount assembly.

FIG. 4 is a cross-sectional view of the protective cover through the mount assembly.

FIG. 5 is a perspective view of an example suction cup.

FIGS. 6A-F are various view of the example suction cup.

FIG. 7 is a perspective view of an example clip.

DETAILED DESCRIPTION

Figure 8:
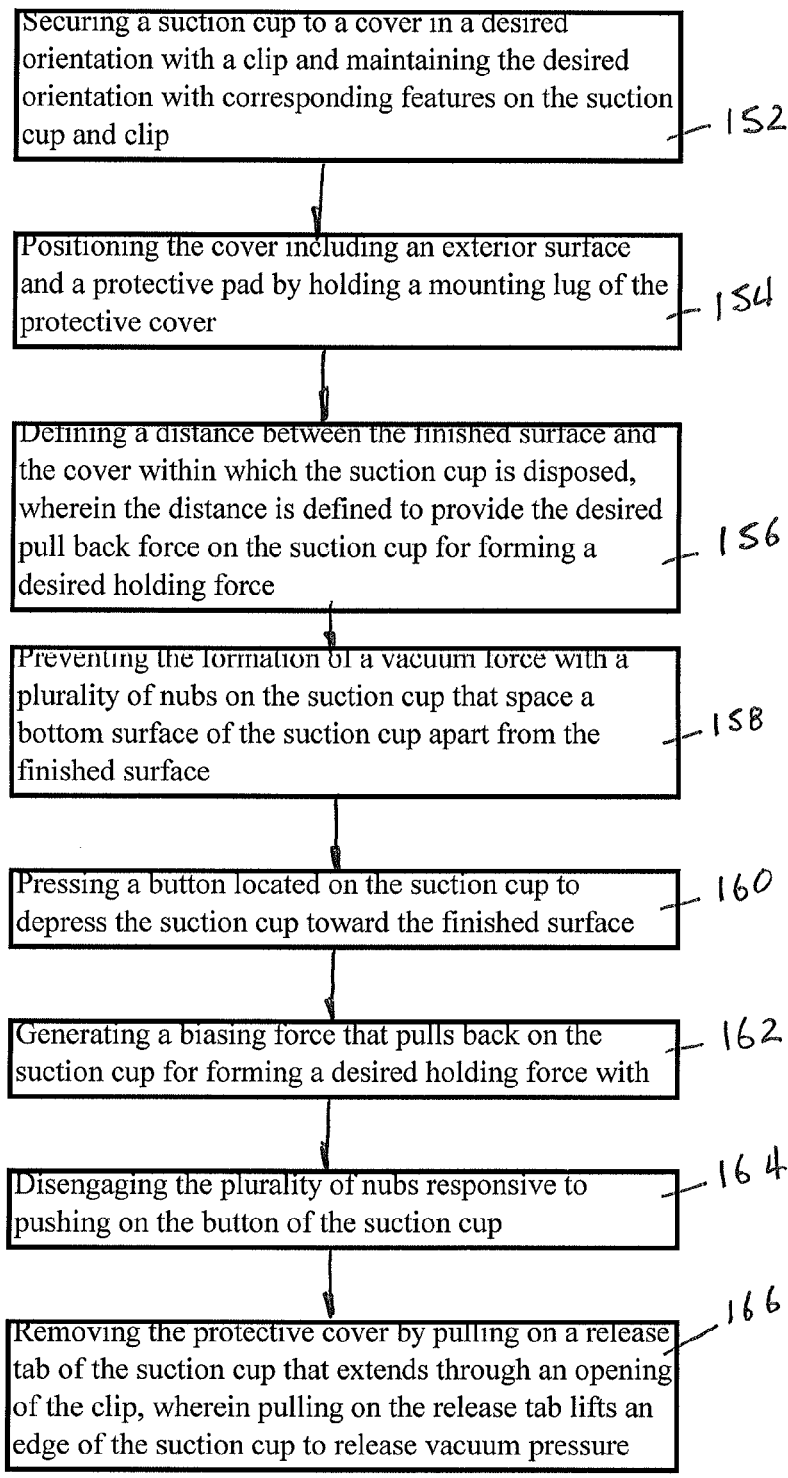
FIG. 8 is a flow chart of an example method of mounting a protective cover assembly.

This disclosure is submitted in furtherance of the constitutional purposes of the U.S. Patent Laws "to promote the progress of science and useful arts" (Article 1, Section 8).

Referring to FIG. 1, a vehicle 10 includes panels 12 that are painted during assembly. The installation of the painted panels 12 are not the end of the assembly process and therefore protective cover assemblies 14 are mounted to the vehicle 10 to prevent damage. The protective cover assemblies 14 are held in place by suction cups 26 (FIG. 5) attached to the protective cover assembly 14 at mounting locations 16. Each of the several mounting locations 16 includes an assembly feature 22 formed in the protective cover 14 and openings for a button 28 and release tab 30 of the suction cup 26. The suction cup 26 is held in place on the protective cover by a clip 24. The clip 24, protective cover and suction cup 26 include features that maintain the position of the cup 26 at each of the mount locations 16.

Current suction cups do not include adequate features for maintaining a position of the suction cup at the mounting location 16. In some instances the suction cup rotates and the release tab can become lodged behind the cover such that an operator could not reach it to remove the protective cover. Force sufficient to overcome the suction provided by the suction cup would then be required to remove the cover. Such forceful removal of the covers could in some instances result in damage to the vehicle.

Accordingly, the disclosed protective cover assembly 14 includes features that maintain the suction cup 26 in a desired orientation such that the release tab 30 remains accessible. Further, the example protective cover assembly 14 includes features that aid in positioning on the vehicle and that prevent errant release of the suction cup 26.

Referring to FIG. 3, the protective cover assembly 14 is shown mounted to a portion of the panel 12. The protective cover assembly 14 includes an exterior cover 18 that is backed by a pad 20 that contacts the panel 12. The pad 20 is formed from a relatively soft and compliant material that is compatible with the surface finish of the panel 12. The pad 20 protects the surface finish, while not disturbing the finish. As appreciated, during assembly, the panels 12 will have been recently painted. Although dry to the touch, the paint or other coating on the panel is typically not fully cured. Accordingly, any material placed in contact with the panels 12 must be selected to not interfere with the curing process.

Each of the example mounting locations 16 includes two openings that are disposed next to the assembly feature 22. A button 28 and the release tab 30 of the suction cup 26 extend through corresponding ones of the two openings to provide access by an operator. The clip 24 includes a slot 52 (FIG. 7) for a stem 36 (FIG. 5) of the button 28 and an opening 50 for the release tab 30. The clip 24 holds the suction cup 26 on the protective cover 16 in a desired orientation. The clip 24 also includes a flange 35 that extends outward from the protective cover assembly 14 to shield the release tab 30 from errant contact.

The suction cup 26 generates a significant holding force on the panel 12 and is very difficult to remove by pulling on the centrally located button 28. However, only a small tug of the release tab 30 is required to dislodge the suction cup 26. This is so because the release tab 30 extends from an edge of the suction cup 26. The release tab 30 includes ridges 46 that aid in gripping and pulling on the release tab 30. Therefore, no special tools or devices are required to break any generated suction and release the suction cup 26 from the panel 12.

Referring to FIG. 4, a sectional view through one of the mount locations 16 reveals that the suction cup 26 is attached to the protective cover 18 by the clip 24. The slot 52 slides under the button 28 and engages the stem 36. The stem 36 includes a shape that corresponds with the slot 52 to prevent relative rotation of the suction cup 26. The assembly feature 22 provides a place to grasp when mounting the protective cover 18 and also aids in shielding the release tab 30 from unwanted contact.

The protective cover 18 is backed by the pad 20 that contacts the panel 12. In the mounting location 16 an additional cushion 32 is provided that is disposed around the suction cup 26 and into the assembly feature 22. The protective cover and cushion 32 hold the suction cup 26 a distance 34 away from the panel 18 in a non-engaged position.

The distance 34 is determined to provide a desired amount of pull back on the suction cup 26 once engaged. As appreciated, the suction cup 26 generates a vacuum when it is engaged, and then pulled back away from the panel 12. The amount of vacuum, and therefore the amount of holding force generated is determined in great part by the distance 34.

Installation of the protective panel assembly 14 to the vehicle 10 is performed by positioning the panel assembly 14 as desired using the assembly feature 22 and button 28 followed by pushing in on the buttons 28 to generate the desired suction force that maintains the protective panel 14 in place. Once the button is released, the protective panel 18 backed by the cushion 32 will pull back on the button an amount determined by the distance 34. This pull back amount generates the desired vacuum and suction force that holds the panels in place.

The amount of vacuum generated by the suction cup 26 is determined to provide sufficient holding force, without generating an excessive amount of vacuum. Excessive vacuum can cause an undesirable uneven curing of the paint on the panel 12. Accordingly, the distance 34 is determined to prevent excessive vacuum build up, while providing the desired level of holding force desired.

Referring to FIGS. 5 and 6A-F, the example suction cup 26 is shown and includes the button 28 that is supported by the stem 36. The example stem is substantially rectangular in shape with a length greater than a width. The shape of the stem 36 cooperates with the slot 52 of the clip 24 to prevent rotation of the suction cup 26 during use. The button 28 serves both to secure the suction cup 26 to the protective cover 18, and also provides the surface that is pushed to secure the suction cup to the panel 12. On either side of the button 28 are locating features 40 that dig into the cushion 32 and pad 20 to further prevent rotation of the suction cup 26.

The suction cup 26 is formed to include concentric ledges 38. The concentric ledges 38 correspond with concentric circles of the suction cup 26. When the suction cup 26 is engaged all or a portion of each concentric circle contacts the panel 12 and contributes to the generation of vacuum that holds the panel assembly 14 in place.

The bottom edge of the suction cup 26 that engages the panel 12 includes slots 42 disposed equally about a circumference of the outer diameter of the suction cup 26. The slots 42 provide a channel to allow air to escape from under the suction cup 26 during installation. In the disclosed example, there are four slots 42 disposed at 90 degree intervals about the suction cup 26.

Also disposed about the edge of the suction cup 26 are nubs 44. The nubs 44 are small raised surfaces disposed at spaced apart intervals on the edge. As the edge is the initial contact surface between the panel 12 and the suction cup 26, the nubs 44 are the first to contact the panel 12. The nubs 44 hold the suction cup 26 just off of the panel 12 enough to prevent the initial generation of a suction force. On a very smooth surface such as a vehicle panel 12, the suction cup 26 may generate a vacuum and corresponding suction force while the protective panel 16 is being moved into position. When this occurs, the release tab 30 must be pulled to release the suction and allow for placement. Such an occurrence is inefficient and therefore the nubs 44 provide for some adjustment movement of the suction cup 26 along the panel 12 without the generation of a vacuum that causes the suction cup 26 to hole in place. The nubs 44 provide just enough of an air gap that some adjustment movement along the surface of the panel 12 is possible. Once the desired position is obtained, a push on the button 28 presses the first concentric circle against the panel 12 to generate the desired vacuum and holding force.

Referring to FIG. 7, the example clip 24 includes the slot 52 that corresponds to the rectangular shape of the stem 36. The slot 52 is sized to provide a slight interference fit with the stem 36 to retain the clip 24 in place, and to hold the suction cup 26. The clip 24 includes the opening 50 for the release tab 30. The opening 50 is of sufficient size to provide clearance for the release tab 30. Accordingly, the sides of the opening 50 do not engage the release tab 30. The clip 24 also includes the flange 35 that extends upward from the surface including bottom surface 48. The flange 35 protects the release tab 30 from errant contact that could undesirably release the suction cup 28 from the panel 12.

Referring to FIG. 8 with continued reference to the other figures, an example method of installing a protective cover to a vehicle is schematically illustrated and generally indicated at 150. Prior to installing the cover to the panel 12, the suction cup 26 is secured to the cover in a desired orientation with the clip while maintaining the desired orientation with the corresponding locating features 40 on the suction cup and the clip as is indicated at 152. The cover is then positioned by holding the mounting lug 22 as is indicated at 154.

A distance is defined between the finished surface of the panel 12 and the cover within which the suction cup 26 is disposed that provides a desired pull back force on the suction cup for forming a desired holding force as is indicated at 156.

A vacuum force is initially prevented by with the plurality of nubs 44 on the suction cup 26 that space a bottom surface of the suction cup apart from the finished surface of the panel 12 as is indicated at 158. The button is pressed to depress the suction cup toward the finished surface as indicated at 160 such that a biasing force that pulls back on the suction cup is generated for forming a desired holding force with the cover as is indicated at 162. Pushing on the button disengages the plurality of nubs to provide for the generation of the vacuum force as is indicated at 164. The cover is removed by pulling on the release tab of the suction cup 26 that extends through the opening of the clip 24 such that pulling on the release tab lifts an edge of the suction cup to release vacuum pressure.

Accordingly, the disclosed protective panel assembly 14 includes an improved suction cup 26 that provides for limited contact during positioning of the panel 14. Further, the assembly 14 includes the clip 24 that holds the suction cup 26 in place while also protecting the release tab 30. The protective cover 18 includes pad 20 and cushion 32 that space pull on the button 28 of the suction cup 26 to generate a vacuum within a desired range that does not effect the surface finish while generating a sufficient holding force.

Although a disclosed example embodiment of this invention has been disclosed, a worker of ordinary skill in this art would recognize that certain modifications would come within the scope of this invention. For that reason, the following claims should be studied to determine the true scope and content of this invention.

What is claimed is:

1. A protective cover assembly for protecting a surface finish during vehicle assembly, the protective cover assembly comprising:
    a cover shaped and sized to cover a portion of a vehicle panel, the cover including at least one mounting location;
    a suction cup secured to the cover at the mounting location, wherein the suction cup includes a button supported by a stem, a release tab, and locating features disposed on either side of the stem that dig into an underside of the cover to prevent rotation of the suction cup relative to the cover; and
    a clip that engages the stem of the suction cup to secure the suction cup to the cover at the mounting location, wherein the clip includes a slot that receives the stem of the suction cup and an opening for the release tab.

2. The assembly as recited in claim 1, wherein the suction cup includes a bottom surface, a top surface and an edge surface between the bottom and top surfaces, the edge surface including a plurality of nubs for spacing the bottom surface away from a surface of the vehicle.

3. The assembly as recited in claim 2, wherein the top surface of the suction cup comprises at least two concentric rings, wherein each of the concentric rings includes a thickness in cross-section between the bottom surface and the top surface that increases from an outermost ring to a central concentric ring.

4. The assembly as recited in claim 2, wherein the release tab extends from the top surface of the suction cup at an outer periphery of the suction cup.

5. The assembly as recited in claim 2, wherein the suction cup includes at least one slot disposed about an outer periphery of the suction cup, the slot defining an air passage between the bottom surface and the top surface.

6. The assembly as recited in claim 5 wherein the air passage defined by the at least one slot is closed when the suction cup is in an installed position and opens responsive to pulling of the release tab.

7. The assembly as recited in claim 1, wherein the locating feature proximate engages a surface of the cover for maintaining a desired rotational position of the suction cup relative to the cover.

8. The assembly as recited in claim 1, wherein the stem comprises first and second spaced apart parallel sides and the slot of the clip includes corresponding flat sides that receive the stem and maintain a desired orientation of the suction cup relative to the cover.

9. The assembly as recited in claim 1, wherein the cover includes a mounting feature for holding and adjusting a position of the cover relative to a surface of the vehicle.

10. A protective cover assembly for protecting a surface finish during vehicle assembly, the protective cover assembly comprising:
    a cover shaped and sized to cover a portion of a vehicle panel, the cover including at least one mounting location, wherein the cover includes a mounting feature for holding and adjusting a position of the cover relative to a surface of the vehicle;
    a suction cup secured to the cover at the mounting location, wherein the suction cup includes a button supported by a stem and a release tab; and
    a clip that engages the stem of the suction cup to secure the suction cup to the cover at the mounting location, wherein the clip includes a slot that receives the stem of the suction cup and an opening for the release tab, wherein the clip includes a flange extending transverse relative to the slot for receiving the stem.

11. A protective cover assembly for protecting a finished surface, the protective cover assembly comprising:
    a cover including an exterior cover backed by a protective pad and at least one mounting location;
    a suction cup secured to the cover at the mounting location, wherein the suction cup includes a button supported by a stem and a release tab, wherein the button, the stem, and the release tab extend through the exterior cover, and locating features disposed on either side of the stem that engage an underside of the cover for preventing rotation of the suction cup relative to the cover; and
    a clip that engages the stem of the suction cup on the exterior cover, the clip including a slot and the stem including parallel surface that fit within the slot to define and maintain a desired orientation between the suction cup and the cover.

12. The protective cover assembly as recited in claim 11, wherein the cover defines a space for the suction cup as the mounting location, the space for the suction cup including a distance for spacing the suction cup from the finished surface such that the suction cup is biased in a direction away from the finished surface in an installed position.

13. The protective cover assembly as recited in claim 12, wherein the distance is determined to provide a desired vacuum force in the suction cup when in the installed position.

14. The protective cover assembly as recited in claim 11, wherein the suction cup includes a plurality of nubs disposed on an edge for spacing a bottom surface of the suction cup away from the finished surface to prevent creation of a vacuum, wherein the plurality of nubs disengage from the finished surface responsive to pushing of the button to create the desired vacuum.

15. The protective cover assembly as recited in claim 11, wherein the suction cup includes a thickness in cross-section that increases from an outer periphery toward a center of the suction cup.

16. A method of securing a protective cover to a finished surface comprising the steps of:
    securing a suction cup to a cover in a desired orientation with a clip and maintaining the desired orientation with corresponding features on the suction cup and clip;
    positioning the cover including an exterior surface and a protective pad by holding a mounting lug of the protective cover;
    preventing the formation of a vacuum force with a plurality of nubs on the suction cup that space a bottom surface of the suction cup apart from the finished surface;
    pressing a button located on the suction cup to depress the suction cup toward the finished surface; and
    generating a biasing force that pulls back on the suction cup for forming a desired holding force with the cover.

17. The method as recited in claim 16, including defining a distance between the finished surface and the cover within which the suction cup is disposed, wherein the distance is defined to provide the desired pull back force on the suction cup for forming a desired holding force.

18. The method as recited in claim 16, including disengaging the plurality of nubs responsive to pushing on the button of the suction cup.

19. The method as recited in claim 16, including removing the protective cover by pulling on a release tab of the suction cup that extends through an opening of the clip, wherein pulling on the release tab lifts an edge of the suction cup to release vacuum pressure.

* * * * *